United States Patent
Steensma et al.

(10) Patent No.: US 11,679,443 B1
(45) Date of Patent: Jun. 20, 2023

(54) APPARATUS FOR A QUICK RELEASE CUTTING DEVICE BLADE ASSEMBLY

(71) Applicant: Lemco Products LLC, Mattawan, MI (US)

(72) Inventors: Timothy Allen Steensma, Mattawan, MI (US); Timothy John Morscheck, Lady Lake, FL (US)

(73) Assignee: Lemco Products LLC, Mattawan, MI (US)

( * ) Notice: Subject to any disclaimer, the term of this patent is extended or adjusted under 35 U.S.C. 154(b) by 0 days.

(21) Appl. No.: 17/583,943

(22) Filed: Jan. 25, 2022

(51) Int. Cl.
*A01D 34/73* (2006.01)
*B23D 51/10* (2006.01)
*B23D 51/14* (2006.01)
*B23D 51/00* (2006.01)

(52) U.S. Cl.
CPC .......... *B23D 51/10* (2013.01); *B23D 51/005* (2013.01); *B23D 51/14* (2013.01)

(58) Field of Classification Search
CPC .. A01D 34/73; A01D 34/4168; A01D 34/736; A01D 42/005
USPC .... 30/392, 208, 276, 347, 369; 56/12.7, 295
See application file for complete search history.

(56) References Cited

U.S. PATENT DOCUMENTS

| | | | |
|---|---|---|---|
| 2,153,771 A * | 4/1939 | Orr | A01D 34/84 56/10.1 |
| 3,541,770 A | 11/1970 | Dufour | |
| 4,265,018 A * | 5/1981 | Schrock | A01D 34/73 30/276 |
| 5,661,909 A * | 9/1997 | Kondo | B23D 51/10 30/392 |
| 6,205,755 B1 | 3/2001 | Bontrager et al. | |
| 7,302,789 B2 | 12/2007 | Eavenson, Sr. et al. | |
| 7,958,710 B2 | 6/2011 | Gilpatrick et al. | |
| 9,480,201 B2 | 11/2016 | Maruyama et al. | |
| 9,560,800 B2 | 2/2017 | Reichen et al. | |
| 10,225,981 B2 | 3/2019 | Kitamura | |
| 2008/0010836 A1* | 1/2008 | Iacona | A01D 42/005 30/122 |
| 2016/0131176 A1* | 5/2016 | Xu | F16B 39/30 411/259 |
| 2016/0153486 A1* | 6/2016 | Xu | F16B 39/30 411/265 |

FOREIGN PATENT DOCUMENTS

EP 3837949 A1 6/2021

* cited by examiner

*Primary Examiner* — Ghassem Alie
(74) *Attorney, Agent, or Firm* — Quinn IP Law

(57) ABSTRACT

An apparatus for a quick release cutting device blade assembly is provided. The apparatus includes a blade carrier assembly. The blade carrier assembly includes an adaptor and a backing plate configured to fit over the central post and including a second flat surface. The adaptor includes a flat end plate including a first flat surface, a central post, and a female threaded portion configured to be engaged to a male threaded portion of an output shaft of a cutting device. The blade carrier assembly is configured to affix a cutting device blade between the first flat surface and the second flat surface. The female threaded portion includes a thread pattern configured for resisting a tool-lock condition when a force transmitted through teeth of the thread pattern is maintained below a maximum operational force.

11 Claims, 8 Drawing Sheets

FIG. 2
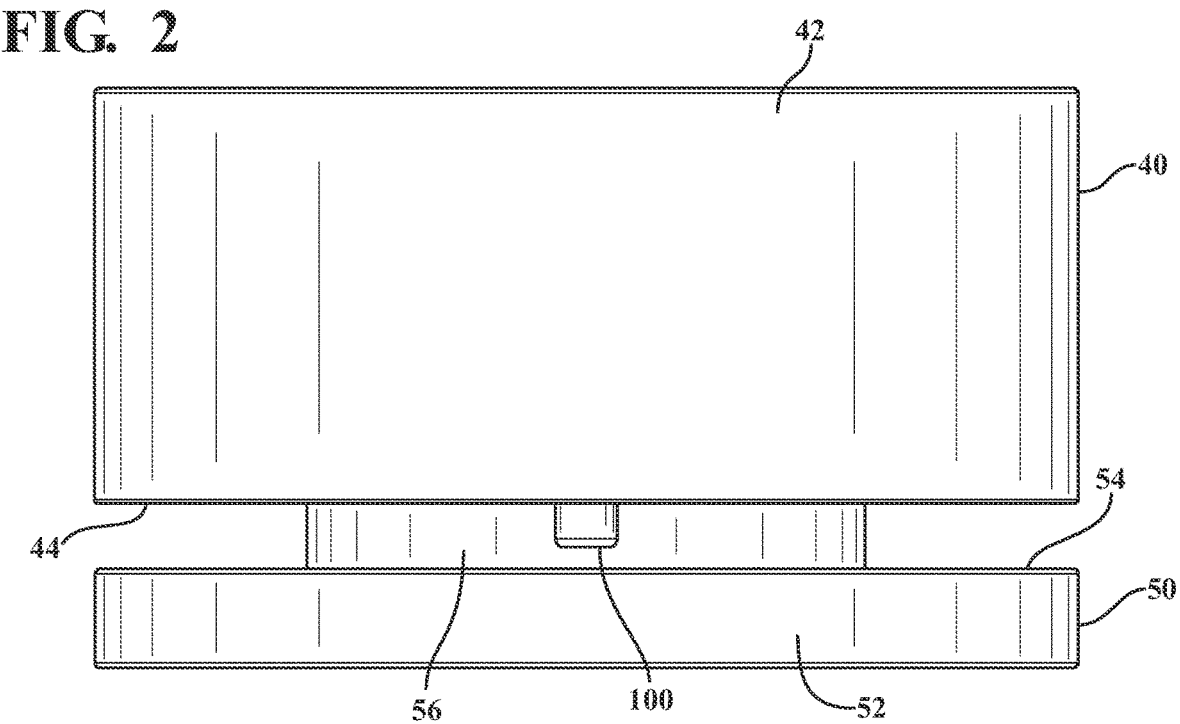
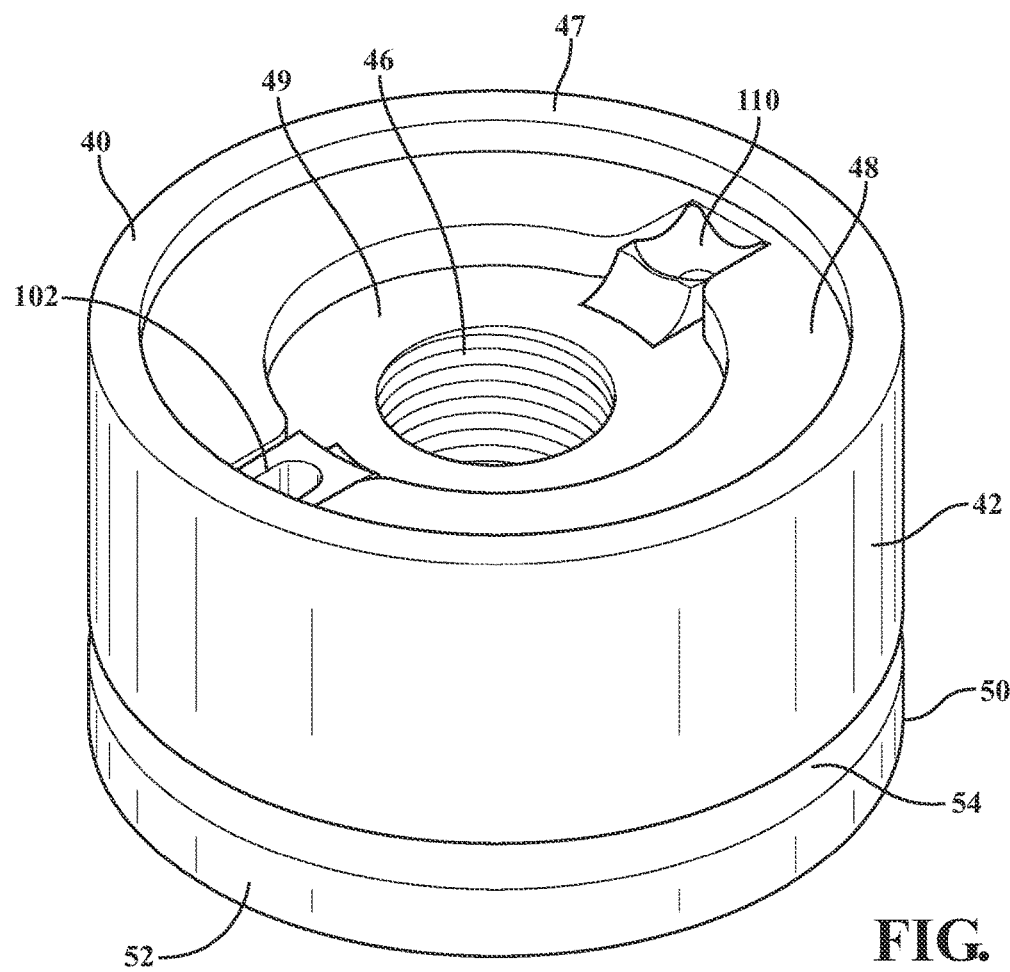
FIG. 3

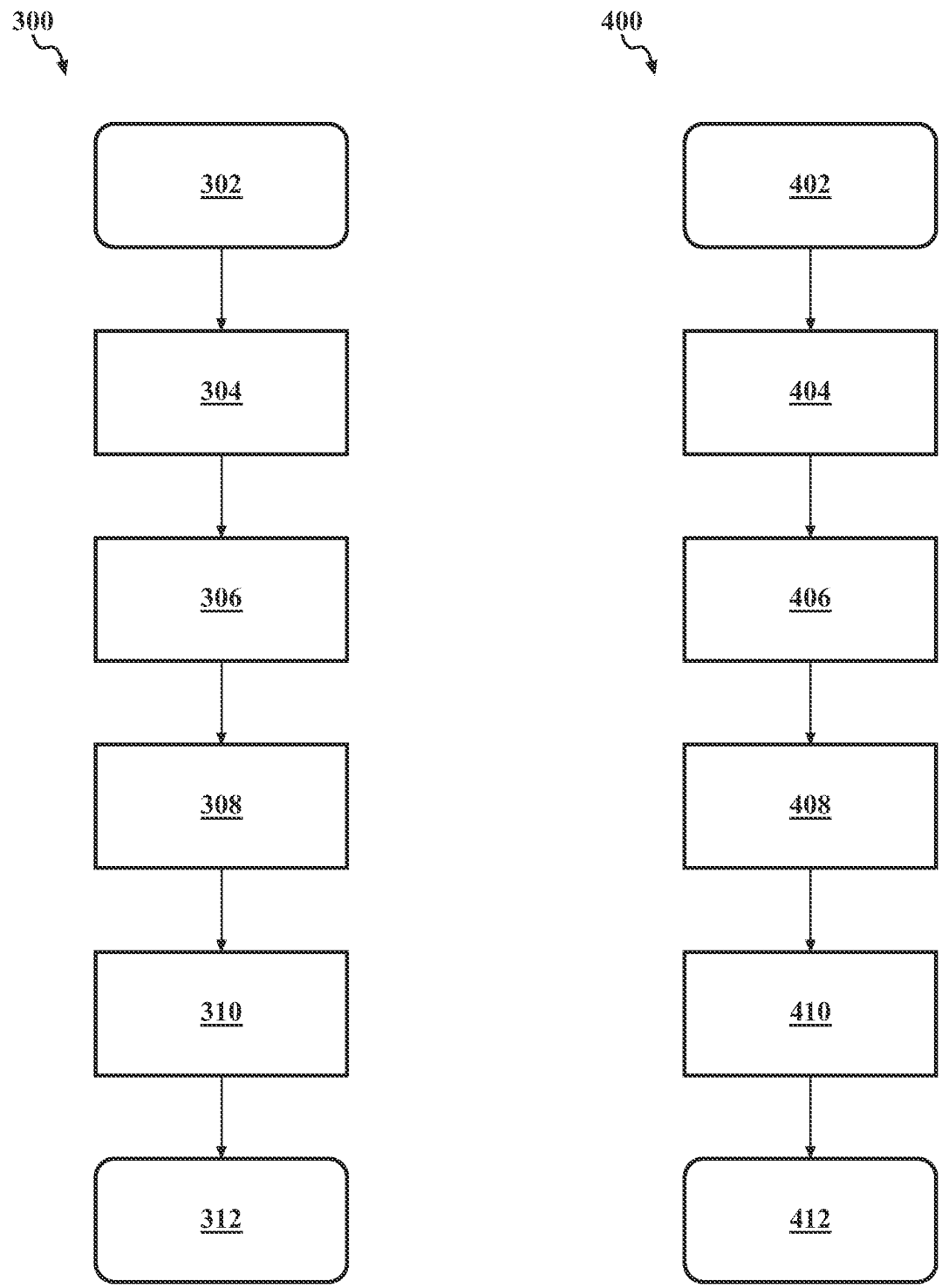

APPARATUS FOR A QUICK RELEASE CUTTING DEVICE BLADE ASSEMBLY

INTRODUCTION

The disclosure generally relates to an apparatus for a quick release cutting device blade assembly.

A cutting device is a device that includes a torque generating device, an output shaft of the torque generating device, and a rotary cutting device blade that is attached to is caused to spin by the output shaft. One example of a cutting device is a lawnmower. Cutting device blades require maintenance such as sharpening and replacement. A commercial cutting device blade may need to be sharpened once a day. According to one configuration in the art, a cutting device blade is attached to the output shaft with a threaded fastener, and significant torque must be applied to the fastener to affix the cutting device blade to the output shaft.

SUMMARY

An apparatus for a quick release cutting device blade assembly is provided. The apparatus includes a blade carrier assembly. The blade carrier assembly includes an adaptor and a backing plate configured to fit over the central post and including a second flat surface. The adaptor includes a flat end plate including a first flat surface, a central post, and a female threaded portion configured to be engaged to a male threaded portion of an output shaft of a cutting device. The blade carrier assembly is configured to affix a cutting device blade between the first flat surface and the second flat surface. The female threaded portion includes a thread pattern configured for resisting a tool-lock condition when a force transmitted through teeth of the thread pattern is maintained below a maximum operational force.

In some embodiments, the adaptor includes a fastener hole. The blade carrier assembly further includes a threaded fastener affixed to the fastener hole and configured for holding the adaptor and the backing plate together.

In some embodiments, the adaptor includes two fastener holes. The blade carrier assembly further includes two threaded fasteners, each threaded fastener affixed to one of the two fastener holes, wherein the two threaded fasteners are configured for holding the adaptor and the backing plate together.

In some embodiments, the blade carrier assembly further includes an engagement pin configured for locking a rotational orientation of the cutting device blade to the blade carrier assembly.

In some embodiments, the engagement pin is spring loaded and is configured to displace and permit the cutting device blade to turn relative to the blade carrier assembly if the cutting device blade receives an impact force.

According to one alternative embodiment, a system for a quick release cutting device blade assembly is provided. The system includes a blade carrier assembly, a cutting device blade configured to fit over the central post, and a conical-shaped washer configured for seating against the blade carrier assembly and transmitting a force to the blade carrier assembly. The blade carrier assembly includes an adaptor and a backing plate configured to fit over the central post and including a second flat surface. The adaptor includes a flat end plate including a first flat surface, a central post, and a female threaded portion configured to be engaged to a male threaded portion of an output shaft of a cutting device. The blade carrier assembly is configured to affix the cutting device blade between the first flat surface and the second flat surface. The female threaded portion includes a thread pattern configured for resisting a tool-lock condition when a force transmitted through teeth of the thread pattern is maintained below a maximum operational force.

In some embodiments, the conical-shaped washer includes a first conical shaped washer, and the system further includes a second conical shaped washer configured for seating against the blade carrier assembly and transmitting a force to the blade carrier assembly.

In some embodiments, the adaptor includes a fastener hole. The blade carrier assembly further includes a threaded fastener affixed to the fastener hole and configured for holding the adaptor and the backing plate together.

In some embodiments, the adaptor includes two fastener holes. The blade carrier assembly further includes two threaded fasteners, each threaded fastener affixed to one of the two fastener holes. The two threaded fasteners are configured for holding the adaptor and the backing plate together.

In some embodiments, the blade carrier assembly further includes an engagement pin configured for locking a rotational orientation of the cutting device blade to the blade carrier assembly.

In some embodiments, the cutting device blade includes a round central opening and two squared off cut-out portions disposed on opposing sides of the round central opening.

According to one alternative embodiment, a cutting device including a quick release cutting device blade assembly is provided. The cutting device includes an electric machine including an output shaft. The output shaft includes a male threaded portion including a thread pattern configured for resisting a tool-lock condition when a force transmitted through teeth of the thread pattern is maintained below a maximum operational force. The output shaft further includes a thrust bearing portion disposed between the electric machine and the male threaded portion including a round flat surface. The cutting device further includes a blade carrier assembly. The blade carrier assembly includes an adaptor and a backing plate disposed upon the central post and including a second flat surface. The adaptor includes a flat end plate including a first flat surface, a central post, and a female threaded portion engaged to the male threaded portion of the output shaft, wherein the female threaded portion including a mating thread pattern to the male threaded portion. The cutting device further includes a first conical-shaped washer including a first end of the first conical-shaped washer including an inner diameter oriented to a first plane and a second end of the first conical-shaped washer including an outer diameter oriented to a second plane. The first plane and the second plane are offset. The conical-shaped washer is disposed upon the output shaft. The first end of the first conical-shaped washer is seated against the thrust bearing portion. The second end of the first conical-shaped washer is seated against the backing plate. The cutting device further includes a second conical-shaped washer including a first end of the second conical-shaped washer including an inner diameter oriented to a third plane and a second end of the second conical-shaped washer including an outer diameter oriented to a fourth plane. The third plane and the fourth plane are offset. The conical-shaped washer is disposed upon the output shaft. The first end of the second conical-shaped washer is seated against the first conical-shaped washer. The cutting device further includes a cutting device blade fit over the central post. The blade carrier assembly affixes the cutting device blade between the first flat surface and the second flat surface.

In some embodiments, the second end of the second conical-shaped washer is seated against the adaptor.

In some embodiments, the adaptor includes a fastener hole. The blade carrier assembly further includes a threaded fastener affixed to the fastener hole and configured for holding the adaptor and the backing plate together. The second end of the second conical-shaped washer is seated against the fastener and is configured for transmitting force to the adaptor through the fastener.

In some embodiments, the first conical-shaped washer is configured for enabling the cutting device blade to spin relative to the blade carrier assembly when an impact force in excess of a threshold impact force is applied to the cutting device blade.

In some embodiments, the second conical-shaped washer is configured for enabling an impact force to further engage the blade carrier assembly upon the male threaded portion.

In some embodiments, the adaptor includes a fastener hole. The blade carrier assembly further includes a threaded fastener affixed to the fastener hole and configured for holding the adaptor and the backing plate together.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 schematically illustrates the blade carrier assembly in side view, in accordance with the present disclosure;

FIG. 3 illustrates the blade carrier assembly in perspective view, in accordance with the present disclosure;

FIG. 10 is a flowchart illustrating a method to engage an apparatus for a quick release cutting device blade assembly to a male threaded portion of an output shaft of an electrically powered cutting device, in accordance with the present disclosure; and FIG. 11 is a flowchart illustrating a method to disengage an apparatus for a quick release cutting device blade assembly from a male threaded portion of an output shaft of an electrically powered cutting device, in accordance with the present disclosure.

DETAILED DESCRIPTION

Figure 1:
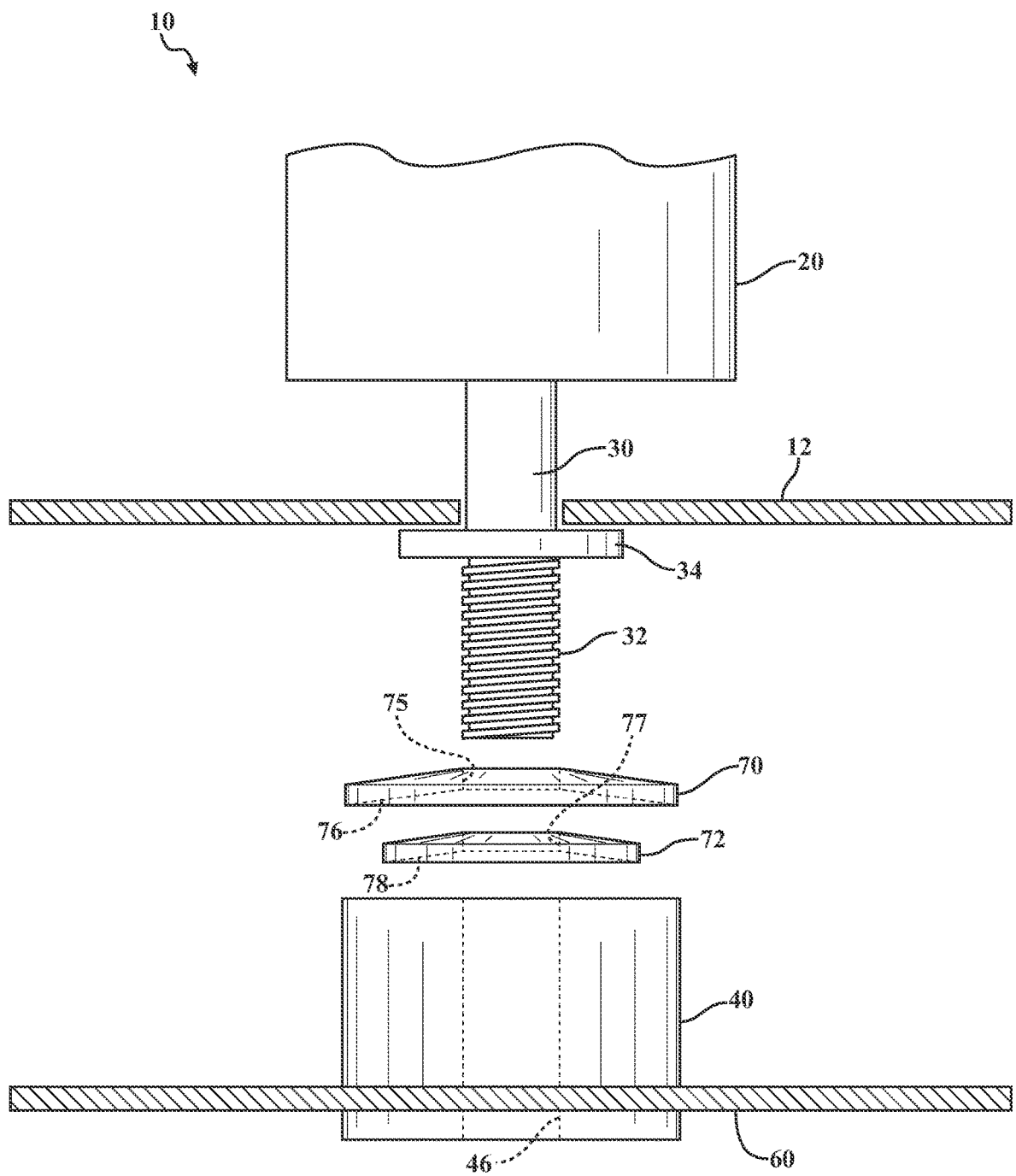
FIG. 1 schematically illustrates an apparatus for a quick release cutting device blade assembly, in accordance with the present disclosure.

Cutting device blades may be time consuming to disengage from a cutting device and then re-engage to the cutting device. Cutting device blades may be affixed to an output shaft of the torque generating device of the cutting device with significant torque, and disengaging and later reengaging the cutting device blade may cause wear and tear upon the cutting device, the output shaft, the torque generating device, and the cutting device blade. If the fastener either shears off or strips out the threading on the output shaft, significant time and cost may be incurred replacing parts. Throughout the disclosure, a cutting device may include a number of embodiments, with one exemplary embodiment being a lawnmower.

Internal combustion engines are used in the art as torque generating devices and for decades have been the primary or dominant type of torque generative devices used in cutting devices. Electric motors or electric machines are used in the art as torque generating devices and have recently gained popularity as a way to reduce emissions and provide a quieter, more enjoyable experience when using a cutting device. Whereas internal combustion engines are configured to cause an attached output shaft to spin in one direction, an electric machine may rotate an attached output shaft in either a forward direction or a rearward direction. Described in another way, an electric machine or electric motor may rotate an attached output shaft in a first or clockwise direction if electrical energy of a first polarity is provided to the electric machine, and the electric machine may rotate the attached output shaft in a second or counter-clockwise direction if electrical energy of a second polarity opposite to the first polarity is provided to the electric machine. It is therefore possible to control an electric machine configured as a torque generating device of a cutting device to operate in a forward direction, for example, a direction configured for cutting grass blades, and to operating in a reverse direction.

Threaded fasteners and threaded shafts are used in the art to secure a first object to a second object. A variety of thread patterns are used in the art and may affect the behavior of the threaded shaft and objects attached thereto. For example, an Acme thread form is used in the art with vises. A vise is a tooling fixture used to hold a part steady and then selectively release the part. A vise may include a first stationary vise gripper, a second mobile vise gripper, an Acme threaded shaft operable to move the second mobile vise gripper closer to and farther away from the first vise gripper, and a rotating handle configured for enabling a person to turn the Acme threaded shaft selectively in a first direction and a second opposite direction. When a torque applied to the threaded shaft is maintained below a maximum operational torque or a force transmitted through the teeth of the thread pattern is maintained below a maximum operational force, the Acme threaded shaft is useful because it may receive torque and transmit force through the teeth of the thread upon a work object, holding the work object, while resisting a tool-lock condition. Although the work piece may be held firm by the Acme threaded shaft when torque is applied in an engaging direction, the Acme threaded shaft is configured to easily release the work piece when torque is applied in an opposite, disengaging direction. Whereas other thread patterns may deform and create a tool-lock condition where torque in a disengaging direction may fail to overcome the tool-lock condition, an Acme thread pattern may resist the tool-lock condition and readily disengage. According to one embodiment, the Acme thread pattern may be described to have a 29° thread angle with a thread height half of the pitch and may be described to include an apex (or crest) and valley (or root) which are flat. A variety of thread patterns may be utilized with the disclosed devices and methods. In one embodiment, an output shaft of torque generating device of a cutting device and a mating cavity on a device useful for quick changing a cutting device blade may include a thread pattern configured for resisting a tool lock condition when torque transmitted through the output shaft is maintained below a maximum operational torque.

A Belleville Spring® may be described as a washer with a conical shape, which is commercially available through the Fan Disc Corporation of Sun Valley, Calif. Throughout the disclosure, a conical-shaped washer may be described as including a Belleville Spring® or a similar thrust washer configured for providing a spring force along a longitudinal direction of a shaft. The conical-shaped washer may have a second end including an outer diameter defining an outer perimeter of the washer and a first end including an inner diameter defining a cavity through which a shaft or fastener may be inserted. The inner diameter exists on a first plane, and the outer diameter exists on a second plane displaced from the first plane. Washer material of constant thickness may connect the inner diameter and the outer diameter and exist in a generally conical shape. Applied to a shaft or a fastener, a conical-shaped washer is useful as a thrust washer, meaning that as a longitudinal compressive force along the shaft or fastener is applied to the conical-shaped washer, the conical-shaped washer acts as a spring. The conical-shaped washer deforms slightly and provides a relatively slowly increasing clamping force to an object being clamped by the shaft or fastener and contacting the conical-shaped washer.

An apparatus and system for a quick release cutting device blade assembly is provided. The apparatus includes a blade carrier assembly configured for easy engagement to and disengagement from a male threaded portion of an output shaft connected to a torque generating device of a cutting device embodied as a reversible electric machine. The blade carrier assembly releasably holds the cutting device blade. The blade carrier assembly includes a female threaded portion configured for receiving the male threaded portion. The male threaded portion and the female threaded portion may include a thread pattern configured for engaging and disengaging without creating a tool-lock condition. The male threaded portion and the female threaded portion may include an Acme thread pattern or a similar thread pattern that resists a tool-lock condition when torque applied to the male threaded portion and the female threaded portion are maintained below a maximum operational torque. The blade and the cutting device may be initially engaged or "hand-tightened". The blade may be affixed or secured to not rotate relative to the cutting device, and the electric machine of the cutting device may be engaged to tighten or further engage the blade carrier assembly to the output shaft. In one embodiment, the output shaft may include a thrust bearing surface integrally formed with the output shaft, such that the blade carrier assembly may tighten or be secured against the thrust bearing surface of the output shaft.

A blade carrier assembly with a female threaded portion may be engaged to an output shaft of a torque generating device of a cutting device, and the blade carrier assembly may be removed by fixing the blade carrier assembly in place and turning the output shaft in a direction to disengage the output shaft from the blade carrier assembly. Such an operation is enabled, utilizing the torque applied by the torque generating device to disengage the blade carrier assembly from the output shaft, so long as the threading of the output shaft is engaged to the blade carrier assembly in a non-tool locked condition. However, a cutting device blade is subject to unanticipated impact forces, for example, when a cutting device is in operation and the cutting device blade strikes a rock. Impact forces may cause torque to be applied to the threaded connection between the blade carrier assembly and the output shaft in excess of a maximum operational torque for the thread pattern of the threaded connection, thereby causing a tool lock condition in the threaded connection.

In one embodiment, one or more conical-shaped washers may be disposed between the blade carrier assembly and the thrust bearing surface of the output shaft. The conical-shaped washer or conical-shaped washers may act as a shock absorber or thrust spring, such that if the cutting device blade receives an impact force, a conical-shaped washer may compress to absorb some of the impact rather than simply permitting the impact force to cause a tool lock condition in the threaded connection between the blade carrier assembly and the output shaft. In one embodiment, a first, smaller conical-shaped washer may be used to absorb impact forces applied to the threaded connection between the output shaft and the blade carrier assembly and a second, larger conical-shaped washer may be used to selectively enable the cutting device blade to spin relative to the blade carrier assembly when an impact force in excess of a threshold impact force is applied to the cutting device blade. In this way, the first, smaller conical-shaped washer enables the blade carrier assembly to be engaged upon to a desired torque upon the output shaft of the torque generating device of the cutting device while maintaining the threading of the output shaft and the blade carrier assembly in a non-tool lock condition. The first, smaller conical-shaped washer may further enable the blade carrier device to receive mild impact torques from rocks and other objects during operation of the cutting device in lawn cutting operation or receive impact forces below a threshold impact force and shunt the impact forces away from the threading of the blade carrier assembly and the output shaft. The second, larger conical-shaped washer enables the cutting device blade to rotate relative to the blade carrier assembly when an impact force larger than the threshold impact force is experienced, thereby preventing torque from being applied to the blade carrier assembly and the output shaft that would create a tool-lock condition between the threading of the blade carrier assembly and the output shaft. One may describe the operation of the two conical-shaped washers as torque limiting the blade with respect to the output shaft.

Referring now to the drawings, wherein like reference numbers refer to like features throughout the several views, FIG. 1 schematically illustrates an apparatus 10 for a quick release cutting device blade assembly. A torque generating device 20 embodied as an electric machine or electric motor is illustrated including an output shaft 30 projecting through a cutting device deck surface 12. The output shaft 30 is configured for transmitting a torque from the torque generating device 20 to a cutting device blade 60 attached to the output shaft 30. The output shaft includes a male threaded portion 32 and a thrust bearing portion 34.

The apparatus 10 includes a blade carrier assembly 40 which may be engaged to the male threaded portion 32. The apparatus 10 further includes two exemplary conical-shaped washers 70 and 72. A first end 75 of the first conical-shaped washer 70 including an inner diameter of the first conical-shaped washer 70 is illustrated. A second end 76 of the first conical-shaped washer 70 including an outer diameter of the first conical-shaped washer 70 is illustrated. A first end 77 of the second conical-shaped washer 72 including an inner diameter of the second conical-shaped washer 72 is illustrated. A second end 78 of the second conical-shaped washer 72 including an outer diameter of the second conical-shaped washer 72 is illustrated. When the apparatus 10 is engaged to the output shaft 30, the conical-shaped washers 70 and 72 are inserted over the male threaded portion 32, and the blade carrier assembly 40 is engaged to the male threaded portion 32, such that a female threaded portion 46 of the blade carrier assembly 40 is threaded upon the male threaded portion 32. The cutting device blade 60 may be temporarily or releasably secured to the cutting device deck 12 or other secure surface such that the cutting device blade does not turn relative to the cutting device. The torque generating device 20 may be energized to spin the output shaft 30 relative to the blade carrier assembly 40 and cause the output shaft 30 to further engage with the blade carrier assembly 40, compress the conical-shaped washers 70 and 72 between the thrust bearing portion 34 and the blade carrier assembly 40. As the compression of the conical-shaped washers increases and the male threaded portion 32 continues to engage the female threaded portion 46, the various parts deform slightly and the blade carrier portion 40 is securely engaged to the output shaft 30. The cutting device blade 60 may then be released, and the cutting device may be utilized to cut blades of grass.

The process to engage the blade carrier assembly 40 the output shaft 30 may be reversed to disengage the blade carrier assembly 40 from the output shaft 30. The cutting device blade 60 may be secured to the cutting device deck 12 or otherwise secured so as not to rotate relative to the cutting device. The torque generating device 20 may be energized to spin the output shaft 30 relative to the blade carrier assembly and cause the output shaft 30 to disengage from the blade carrier assembly 40. This spinning of the output shaft 30 may continue until the output shaft 30 is disengaged from the blade carrier assembly 40. The blade carrier assembly 40 and the attached cutting device blade 60 may then be processed separately to either sharpen the cutting device blade 60 or replace the cutting device blade 60. The male threaded portion 32 and the female threaded portion 46 may include a thread pattern configured for resisting a tool lock condition when torque transmitted through the output shaft is maintained below a maximum operational torque.

FIG. 2 schematically illustrates the blade carrier assembly 40 in side view. The blade carrier assembly 40 includes an adaptor 50 and a backing plate 42. The adaptor 50 includes a central post 56 and a flat end plate 52. The backing plate 42 is configured to fit over the central post 56. The adaptor 50 includes a first flat surface 54, and the backing plate 42 includes a second flat surface 44, such that the cutting device blade 60 of FIG. 1 may be mounted to the central post 56 and gripped in place between the first flat surface 54 and the second flat surface 44. In one embodiment, an engagement pin 100 may be utilized to hold the cutting device blade 60 in a fixed rotational orientation relative to the central post 56. In one embodiment, the engagement pin 100 may be spring loaded, such that when a threshold impact force is applied to the cutting device blade 60, the blade may displace the engagement pin 100 and spin relative to the central post 56. This ability of the blade to displace prevents the impact force from causing damage to the blade and/or the torque generating device 20 of FIG. 1.

FIG. 3 illustrates the blade carrier assembly 40 in perspective view. The blade carrier assembly 40 includes the adaptor 50 and the backing plate 42. The adaptor 50 includes the female threaded portion 46 and a flat end plate 52. The backing plate 42 is configured to fit over the central post 56. The adaptor 50 includes the first flat surface 54. The adaptor 50 further includes a recessed surface 49. The backing plate 42 includes a thrust bearing surface 47 configured for abutting and transmitting force with the conical-shaped washer 70 of FIG. 1. The backing plate further includes a recessed surface 48. The adaptor 50 includes an engagement pin holding feature 102 and a blade carrier assembly locking fastener hole 110. The engagement pin holding feature 102 includes features configured for holding the engagement pin 100 of FIG. 1 in place and providing for a spring force against depression of the engagement pin 100. The blade carrier assembly locking fastener hole 110 is configured for receiving a threaded fastener configured for holding the backing plate 42 to the adaptor 50, such that the blade carrier assembly 40 remains a unitary piece even when the blade carrier assembly 40 is disengaged from the output shaft 30 of FIG. 1, for example, as the cutting device blade 60 of FIG. 1 is being sharpened. By retaining the blade carrier assembly 40 as a unitary piece, handling of the cutting device blade 60 of FIG. 1 while the blade carrier assembly 40 is disengaged from the output shaft 30 of FIG. 1 is simplified.

Figure 4:
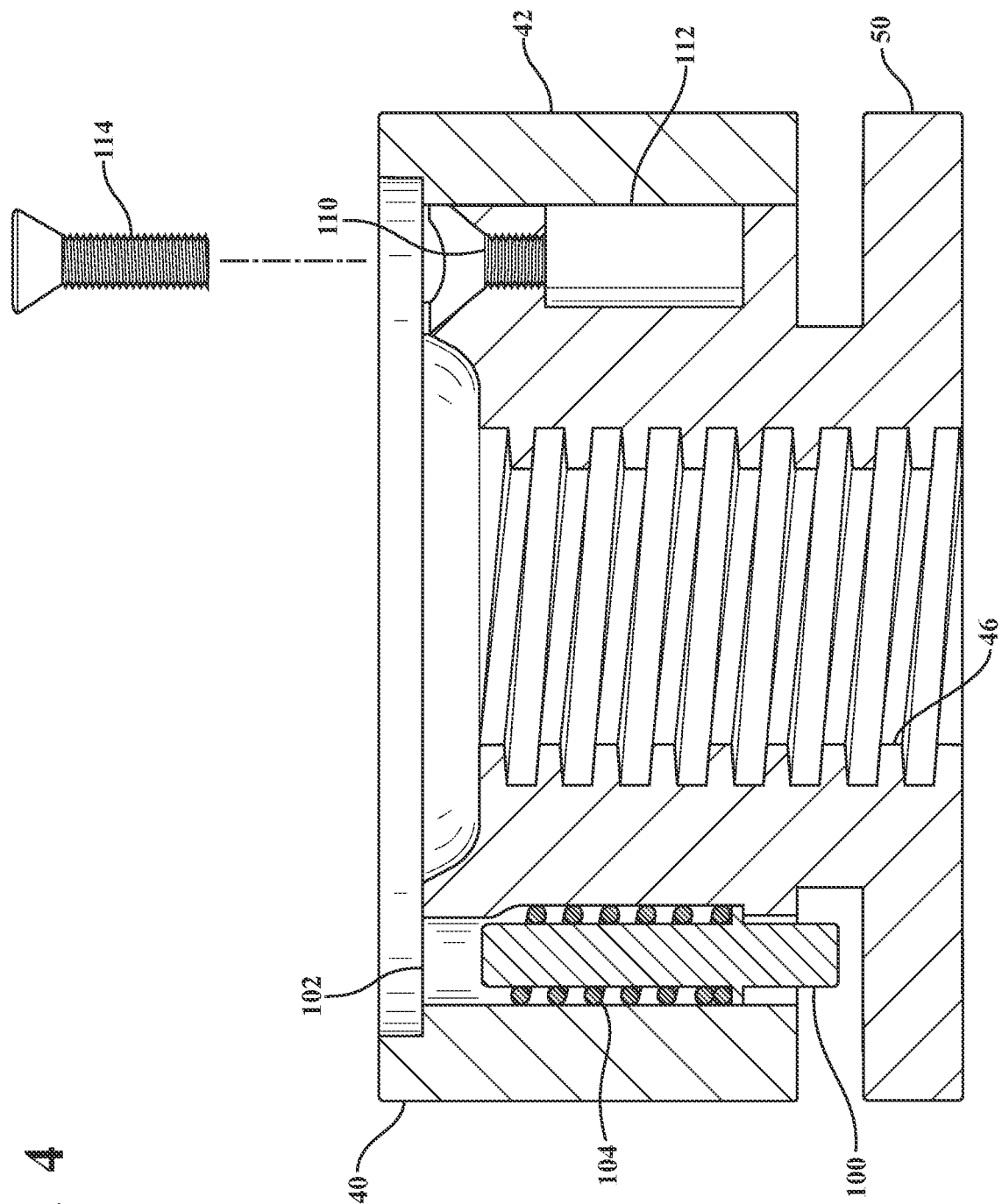
FIG. 4 schematically illustrates the blade carrier assembly in cross-sectional view, in accordance with the present disclosure.

FIG. 4 schematically illustrates the blade carrier assembly 40 in cross-sectional view. The blade carrier assembly 40 includes the adaptor 50 and the backing plate 42. The adaptor 50 includes the female threaded portion 46. The backing plate 42 is fit over the central post 56 of the adaptor 50. The engagement pin 100 is illustrated disposed within the engagement pin holding feature 102, with a spring 104 disposed about the engagement pin 100 and configured to provide spring force against the engagement pin 100 being displaced upwardly. In one embodiment, a threaded fastener 114 may be engaged to the blade carrier assembly locking fastener hole 110 of the adaptor 50, and a wide head of the threated fastener 114 may engage with the recessed surface 48 of the backing plate 42, thereby holding the adaptor 50 and the backing plate 42 together. In another embodiment, the threaded fastener 114 is illustrated in position to be engaged to the blade carrier assembly locking fastener hole 110 and is engaged to fastener mating feature 112, thereby locking the backing plate 42 to the adaptor 50.

Referring now to FIGS. 1-4, operation of the conical-shaped washers 70 and 72 is described. The conical-shaped washer 70 includes a first end including an inner diameter that, when the blade carrier assembly is engaged to the male threaded portion 32, is seated against the thrust bearing portion 34. The conical-shaped washer 70 includes a second end including an outer diameter that is seated against the thrust bearing surface 47 of the backing plate 42. This conical-shaped washer 70 provides force upon the backing plate 42. A magnitude of the force applied by the conical-shaped washer 70 upon the backing plate 42 determines a magnitude of a compression force applied to the cutting device blade 60 between the backing plate 42 and the adaptor 50. The magnitude of the compression force applied to the cutting device blade 60 determines how large of an impact force may be applied to the cutting device blade 60, for example, as a result of the cutting device blade 60 striking a rock, before the cutting device blade 60 will turn relative to the blade carrier assembly 40. This compression force and the resulting threshold impact force that will cause the cutting device blade 60 to turn relative to the blade carrier assembly 40 may be selected by selection of the conical-shaped washer 70 and its properties, such as its spring constant and conical geometry.

The conical-shaped washer 72 includes a first end including an inner diameter that, when the blade carrier assembly is engaged to the male threaded portion 32, is seated against the conical-shaped washer 70. The conical-shaped washer 72 includes a second end including an outer diameter that is seated against the adaptor 50 or an object that is connected to and may transmit force to the adaptor 50. In one embodiment, the conical-shaped washer may be seated against the recessed surface 49 of the adaptor 50. In another embodiment, the second end of the conical-shaped washer 72 is seated against the threaded faster 114 which is engaged with the blade carrier assembly locking fastener hole 110 of adaptor 50. The conical-shaped washer 72 acts as an axial spring, applying a spring force upon the adaptor 50 based upon a distance between the adaptor 50 and the thrust bearing portion 34. As the threaded connection between the male threaded portion 32 and the female threaded portion 46 is increasingly engaged, the distance between the adaptor 50 and the thrust bearing portion is correspondingly decreased. As this distance is decreased, the conical-shaped washer 72 is increasingly compressed and provides a correspondingly increasing spring force against the adaptor 50. The conical-shaped washer 72 may be selected based upon factors such as spring constant and conical geometry to provide a desired spring force when the adaptor 50 is a selected distance from the thrust bearing portion 34. When impact forces act upon the cutting device blade 60 engagement of the female threaded portion 46 to the male threaded portion 32 is incrementally increased, and the conical-shaped washer 72 is additionally compressed. Further, as described herein, the conical-shaped washer 70 enables the cutting device blade 60 to rotate relative to the blade carrier assembly 40 if an impact force greater than a threshold impact force is experienced, thereby protecting the blade carrier assembly 40 from experiencing a torque greater than a maximum operating torque in order to avoid a tool lock condition, as described herein.

Figure 5:
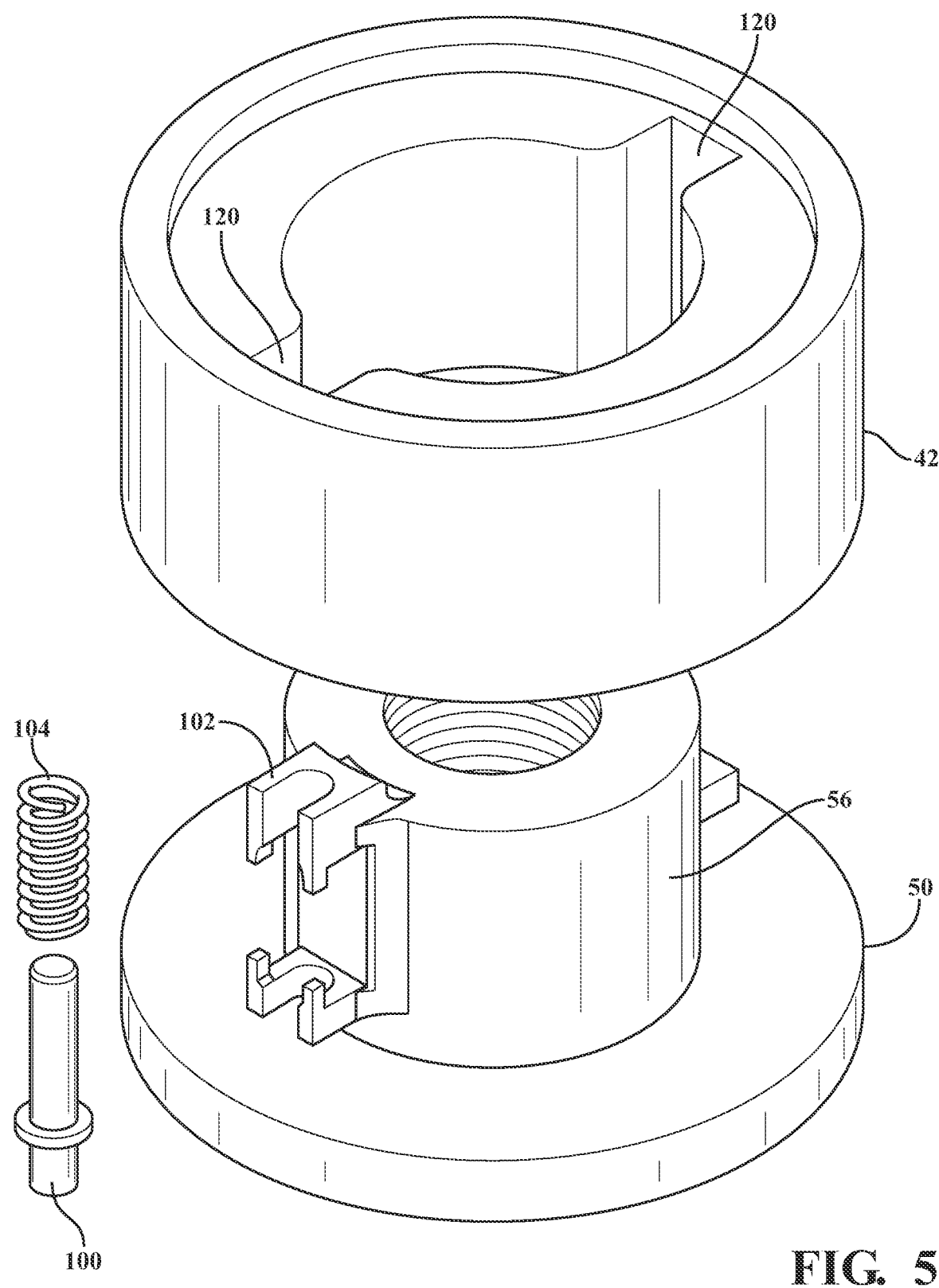
FIG. 5 schematically illustrated the adaptor and the backing plate in perspective view in a disassembled state, in accordance with the present disclosure.

FIG. 5 schematically illustrated the adaptor 50 and the backing plate 42 in perspective view in a disassembled state. The adaptor 50 is illustrated including the central post 56 and the engagement pin holding feature 102 affixed to the central post 56. The engagement pin 100 and the spring 104 are additionally illustrated. The backing plate 42 is illustrated including two recessed portions 120. The recessed portions 120 make room for the engagement pin holding feature 102 of the adaptor 50 and the blade carrier assembly locking fastener hole 110 of the adaptor 50 of FIG. 4.

Figure 6:
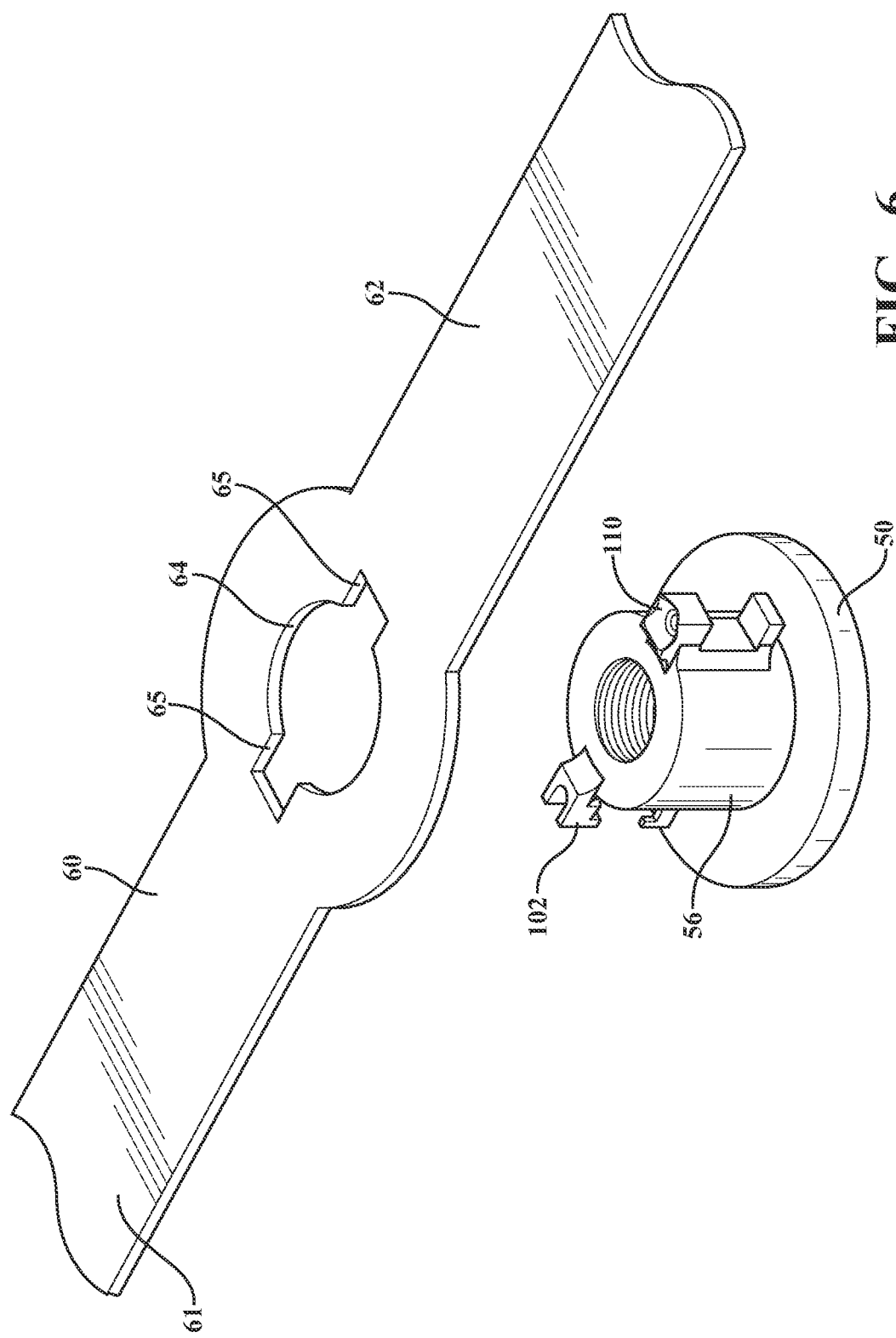
FIG. 6 schematically illustrates the cutting device blade and the adaptor in perspective view in a disassembled state, in accordance with the present disclosure.

FIG. 6 schematically illustrates the cutting device blade 60 and the adaptor 50 in perspective view in a disassembled state. The cutting device blade 60 is illustrated including a central opening 64 configured to be fit over the central post 56 of the adaptor 50. The cutting device blade 60 is further illustrated including cut-out portions 65 configured to be fit over the engagement pin holding feature 102 of the adaptor 50 and the blade carrier assembly locking fastener hole 110 of the adaptor 50. In one embodiment, the engagement pin 100 of FIG. 1 engages within one of the cut-out portions 65. The cutting device blade 60 fits onto the central post 56 and may spin relative to the adaptor 50 until the engagement pin 100 is engaged to one of the cut-out portions 65. In one embodiment, the engagement pin 100 acts as an assembly aid, providing a location to stop rotation of the cutting device blade 60 relative to the cut-out portions 65. In one embodiment, an edge of the cut-out portions 65 may be angled in order to facilitate the engagement pin 100 being displaced when a threshold impact force is experienced. In another embodiment, the engagement pin 100 may act in coordination with a compressive force applied between the adaptor 50 and the backing plate of FIG. 1 to prevent the cutting device blade 60 from turning relative to the blade carrier assembly of FIG. 1 unless a threshold impact force is experienced. In another embodiment, as described in relation to FIG. 7 herein, the engagement pin 100 may be omitted from the blade carrier assembly 40 of FIG. 1. The cutting device blade 60 may be described as including a round central opening 64 with two squared off cut-out portions 65 disposed on opposing, distal sides of the round central opening 64.

The cutting device blade 60 includes a first arm 61 and a second arm 62. A central portion of the cutting device blade 60 is illustrated. The cutting device blade 60 further include an end to each of the first arm 61 and the second arm 62. Each end includes a sharpened leading edge and may include an angled portion on the trailing edge. The angled portion acts as a fan blade, propelling air and grass particles upwards or sideways away from the cutting device blade 60.

Figure 7:
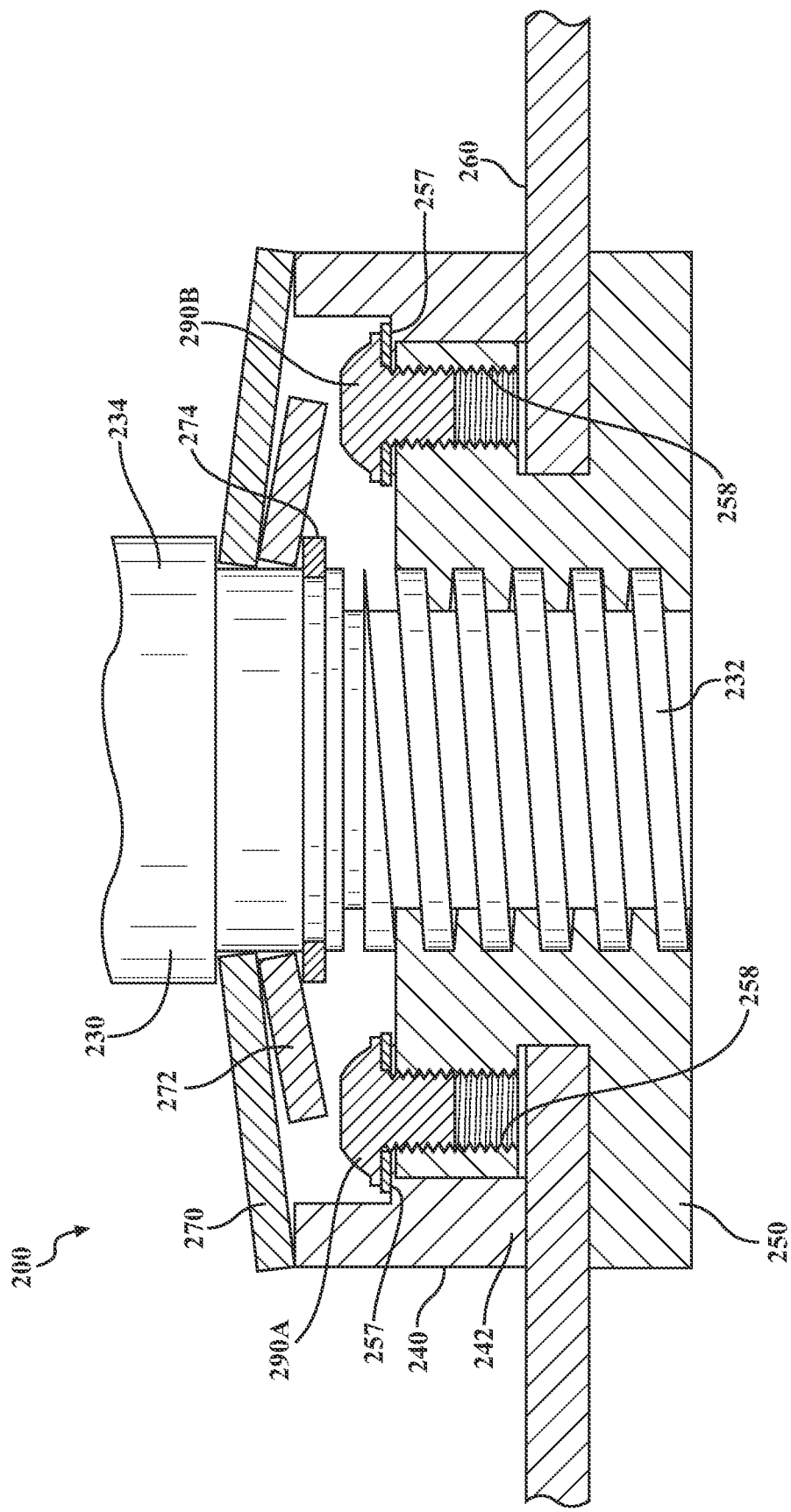
FIG. 7 illustrates in cross-sectional view an alternative embodiment of a blade carrier adaptor, in accordance with the present disclosure.

FIG. 7 illustrates in cross-sectional view an alternative embodiment of a blade carrier adaptor 240. An apparatus 200 is illustrated attached to a male threaded portion 232 of an output shaft 230. The output shaft 230 includes a relatively wider portion 234 which acts as a thrust bearing portion. The blade carrier adaptor 240 is illustrated including an adaptor 250 and a backing plate 242.

The apparatus 200 of FIG. 7 operates similarly to the apparatus 10 of FIG. 1. In place of an engagement pin, the apparatus 200 includes a first threaded fastener 290A and a second threaded fastener 290B, each securing the backing plate 242 to fastener holes 258 of the adaptor 250. The threaded fasteners 290A and 290B may include large heads such that they overlap with portions of the backing plate 242 when the adaptor 250 is assembled with the backing plate 242. In another embodiment, a washer 257 may be used with each of the threaded fasteners 290A and 290B. In one embodiment, the washer 257 may be a conical-shaped washer. The threaded fasteners 290A and 290B may be configured for retaining the backing plate 242 to the adaptor 250 when the male threaded portion 232 is disengaged from the female threaded portion of the adaptor 250.

A first conical-shaped washer 270 and a second conical-shaped washer 272 are illustrated affixed to the output shaft 230 with a C-shaped shaft ring 274. With the cutting device blade 260 in a locked state relative to the rest of the cutting device, as the male threaded portion 232 turns to engage with the mating female threaded portion of the adaptor 250, the first conical-shaped washer 270 applies force to a top surface of the backing plate 242. Similarly, as the male threaded portion 232 turns to engage with the mating female threaded portion of the adaptor 250, the second conical-shaped washer 272 applies force to a top surface of the adaptor 250 or an object affixed to and transmitting force to the adaptor 250, such as one or both of the threaded fasteners 290A and 290B. The first conical-shaped washer 270 acts similarly to the conical-shaped washer 70 of FIGS. 1-4, creating a compressive force between the adaptor 250 and the backing plate 242 to keep the cutting device blade 260 from turning relative to the blade carrier assembly 240. The second conical-shaped washer 272 acts similarly to the conical-shaped washer 72 of FIGS. 1-4, controlling force applied between the threads of the male threaded portion 232 and the female threaded portion of the adaptor 250 and additionally acting to absorb mild impact forces acting upon the cutting device blade 260.

Figure 8:
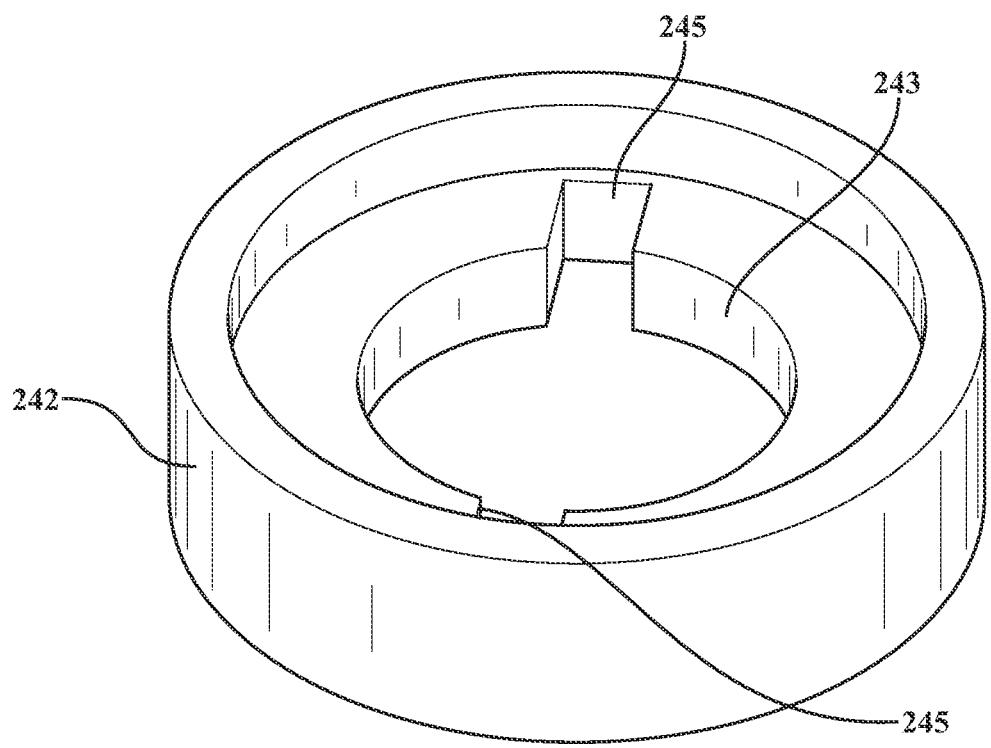
FIG. 8 schematically illustrates in perspective view the backing plate of FIG. 7, in accordance with the present disclosure.

FIG. 8 schematically illustrates in perspective view the backing plate 242 of FIG. 7. The backing plate 242 includes an inner diameter 243 configured for fitting over a central post of the adaptor 250 of FIG. 7. The backing plate 242 further includes two cut-out portions 245 configured to fit over projecting tabs 259 of the adaptor 250 of FIG. 9 including the fastener holes 258 operable to receive the first threaded fastener 290A and the second threaded fastener 290B of FIG. 7.

Figure 9:
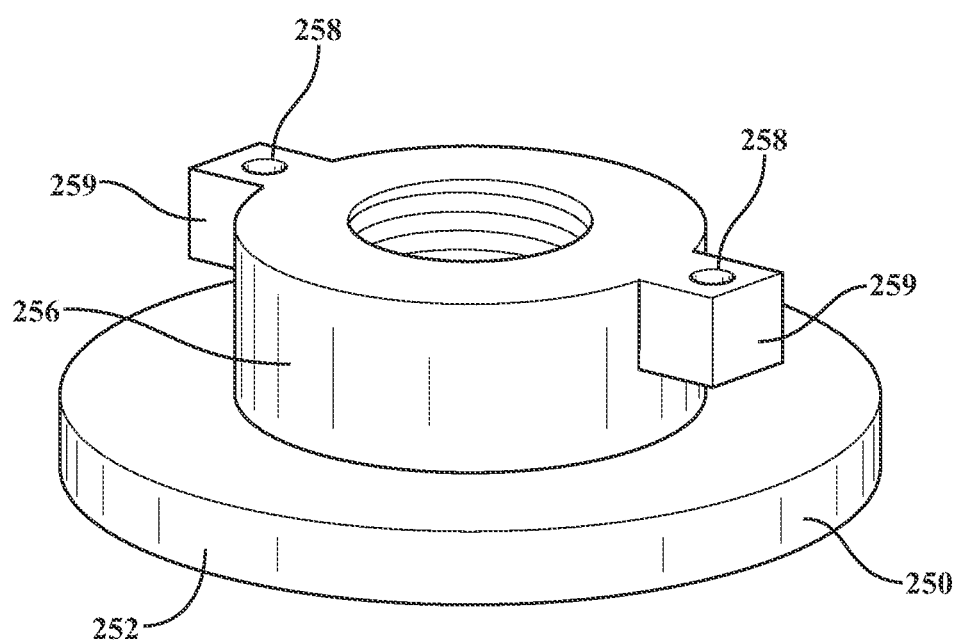
FIG. 9 schematically illustrates in perspective view the adaptor of FIG. 7, in accordance with the present disclosure.

FIG. 9 schematically illustrates in perspective view the adaptor 250 of FIG. 7. The adaptor 250 includes and end plate 252, a central post 256, and two projecting tabs 259 including two fastener holes 258 configured to receive the first threaded fastener 290A and the second threaded fastener 290B of FIG. 7.

FIG. 10 is a flowchart illustrating a method 300 to engage an apparatus for a quick release cutting device blade assembly to a male threaded portion of an output shaft of an electrically powered cutting device. The method 300 starts at step 302. At step 304, at least one conical-shaped washer is placed upon the output shaft, and a pre-assembled blade carrier assembly including a cutting device blade is threaded onto or hand-tightened onto the output shaft. At step 306, the cutting device blade is fixed in place relative to the cutting device such that the cutting device blade may not spin relative to the cutting device. At step 308, an electric machine of the cutting device is energized to cause the output shaft to spin in a direction to further engage the male threaded portion to the blade carrier assembly. Once the output shaft is fully engaged to the blade carrier assembly, the method 300 advances to step 310, where the cutting device blade is made free to spin and the cutting device is utilized to mow lawns. At step 312, the method 300 ends. The steps provided in relation to method 300 are exemplary, a number of additional or alternative method steps are envisioned, and the disclosure is not intended to be limited to the examples provided herein.

FIG. 11 is a flowchart illustrating a method 400 to disengage an apparatus for a quick release cutting device blade assembly from a male threaded portion of an output shaft of an electrically powered cutting device. The method 400 starts at step 402. At step 404, the cutting device is made inactive and the cutting device blade is fixed in place relative to the cutting device such that the cutting device blade may not spin relative to the cutting device. At step 406, an electric machine of the cutting device is energized to cause the output shaft to spin in a direction to disengage the male threaded portion from the blade carrier assembly. At step 408, the male threaded portion is fully disengaged from the blade carrier assembly and the apparatus may be removed from the cutting device. At step 410, the cutting device blade may be sharpened or the cutting device blade may be removed from the blade carrier assembly and replaced with a new cutting device blade. At step 412, the method 400 ends. The steps provided in relation to method 400 are exemplary, a number of additional or alternative method steps are envisioned, and the disclosure is not intended to be limited to the examples provided herein.

Referring again to FIG. 1, engaging the output shaft 30 to the blade carrier assembly 40 may be performed automatically. Full or desired engagement of the output shaft 30 to the blade carrier assembly 40 may be determined according to a number of factors, for example, according to a desired engagement torque applied by the torque generating device 20 or according to a desired distance between the thrust bearing portion 34 and the blade carrier assembly 40 or the adaptor 50 of the blade carrier assembly 40. Such engagement may be performed manually, for example, with a torque gauge providing a measurement or estimate of a torque being applied by the torque generating device 20 upon the output shaft 30. In another embodiment, a torque sensor may be utilized to drive the torque generating device 20 automatically until a desired output torque is reached, and then the torque generating device 20 may be deactivated.

In another embodiment, a computerized controller may be provided upon the cutting device, with the computerized controller operating programming to monitor sensor readings, determine a current engagement of the blade carrier assembly 40 upon the output shaft 30, and control the torque generating device 20 to effect engagement or disengagement of the blade carrier assembly 40 and the output shaft 30. In one embodiment, the computerized controller may monitor an increase in torque based upon rotation of the output shaft. In a first, relatively lower torque region, the threading of the male threaded portion 32 may engage with the threading of the female threaded portion 46 without compressing the conical-shaped washers 70 and 72. Because the washers are not yet being compressed, the torque utilized to achieve a given rotation or displacement may be relatively small. In a second, relatively higher torque region, as rotation of the output shaft compresses one or both of the conical-shaped washers 70 and 72, the torque used by the torque generating device 20 to achieve rotation of the output shaft 30 increases. The computerized controller may utilize the change between the torque regions to selectively compress the conical-shaped washer 70 and 72 by desired values or increase an engagement torque between the male threaded portion 32 and the female threaded portion 46 by an incremental amount once the conical-shaped washers are being compressed. A number of computerized control methods are envisioned, and the disclosure is not intended to be limited to the embodiments disclosed herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for a quick release cutting device blade assembly, the system comprising:
   a blade carrier assembly including:
      an adaptor including:
         a flat end plate including a first flat surface;
         a central post; and
         a female threaded portion configured to be engaged to a male threaded portion of an output shaft of a cutting device;
      a backing plate configured to fit over the central post and including a second flat surface;
   a cutting device blade configured to fit over the central post; and
   a conical-shaped washer configured for seating against the blade carrier assembly and transmitting a force to the blade carrier assembly; and
   wherein the blade carrier assembly is configured to affix the cutting device blade between the first flat surface and the second flat surface; and
   wherein the female threaded portion includes an Acme thread pattern including a 29° thread angle, a thread height half of the pitch, a flat crest, and a flat root.

2. The system of claim 1, wherein the conical-shaped washer includes a first conical shaped washer; and
   further comprising a second conical shaped washer configured for seating against the blade carrier assembly and transmitting a force to the blade carrier assembly.

3. The system of claim 1, wherein the adaptor includes a fastener hole; and wherein the blade carrier assembly further includes a threaded fastener affixed to the fastener hole and configured for holding the adaptor and the backing plate together.

4. The system of claim 1, wherein the adaptor includes two fastener holes; and wherein the blade carrier assembly further includes two threaded fasteners, each threaded fastener affixed to one of the two fastener holes, wherein the two threaded fasteners are configured for holding the adaptor and the backing plate together.

5. The system of claim 1, wherein the blade carrier assembly further includes an engagement pin configured for locking a rotational orientation of the cutting device blade to the blade carrier assembly.

6. The system of claim 1, wherein the cutting device blade includes a round central opening and two squared off cut-out portions disposed on opposing sides of the round central opening.

7. A system for a quick release cutting device blade assembly, the system comprising:

a blade carrier assembly including:
an adaptor including:
a flat end plate including a first flat surface;
a central post; and
a female threaded portion configured to be engaged to a male threaded portion of an output shaft of a cutting device;
a backing plate configured to fit over the central post and including a second flat surface;
a cutting device blade configured to fit over the central post; and
a conical-shaped washer configured for seating against the blade carrier assembly and transmitting a force to the blade carrier assembly; and wherein the blade carrier assembly is configured to affix the cutting device blade between the first flat surface and the second flat surface; and wherein the female threaded portion includes an Acme thread pattern including a 29° thread angle, a thread height half of the pitch, a flat apex, and a flat valley.

8. The system of claim 7, wherein the conical-shaped washer includes a first conical shaped washer; and further comprising a second conical shaped washer configured for seating against the blade carrier assembly and transmitting a force to the blade carrier assembly.

9. The system of claim 7, wherein the adaptor includes a fastener hole; and wherein the blade carrier assembly further includes a threaded fastener affixed to the fastener hole and configured for holding the adaptor and the backing plate together.

10. The system of claim 7, wherein the adaptor includes two fastener holes; and wherein the blade carrier assembly further includes two threaded fasteners, each threaded fastener affixed to one of the two fastener holes, wherein the two threaded fasteners are configured for holding the adaptor and the backing plate together.

11. The system of claim 7, wherein the cutting device blade includes a round central opening and two squared off cut-out portions disposed on opposing sides of the round central opening.

\* \* \* \* \*